No. 854,512. PATENTED MAY 21, 1907.
C. T. MAPES.
YOKE AND YOKE SCREW.
APPLICATION FILED SEPT. 21, 1906.
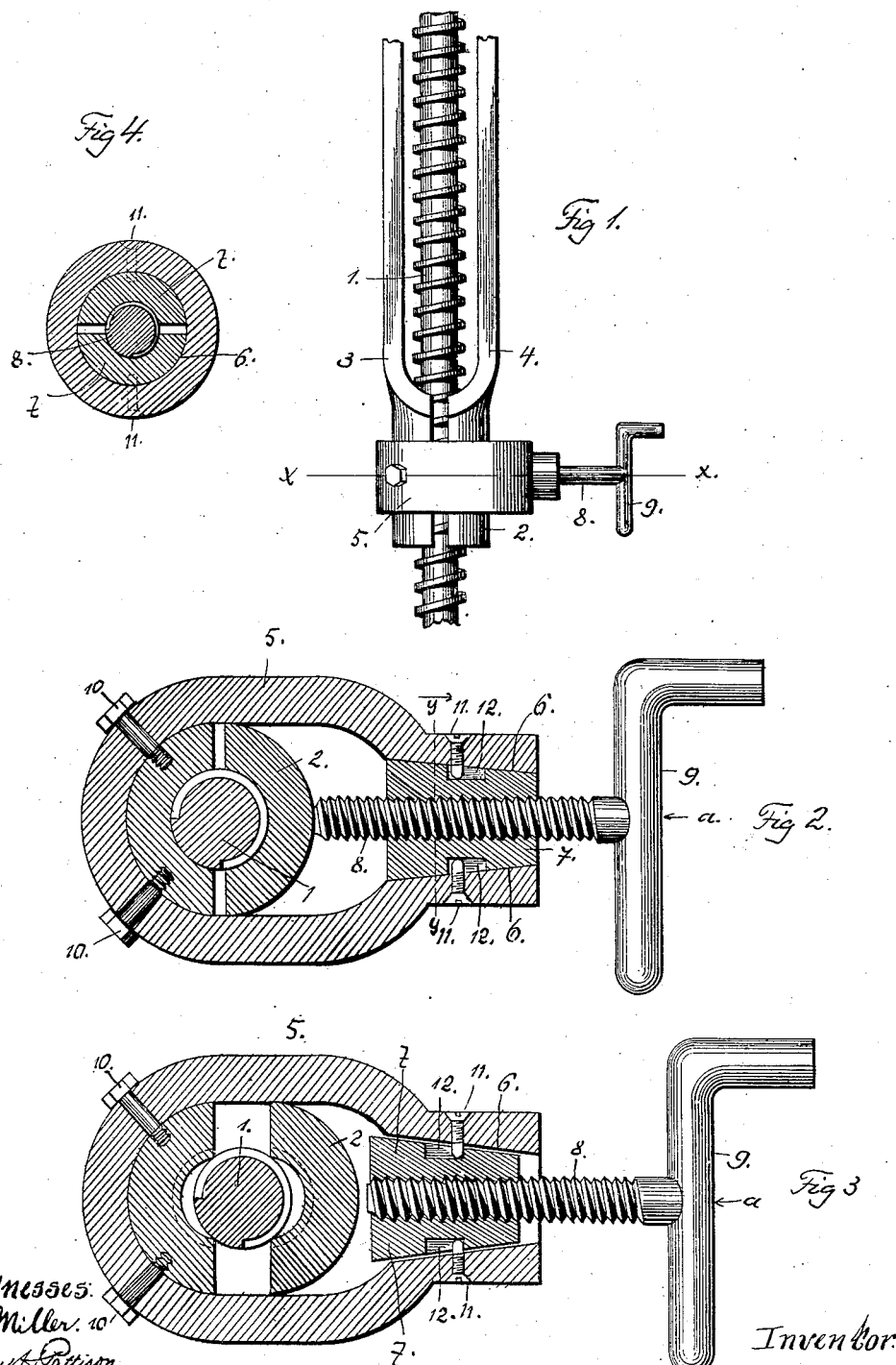

UNITED STATES PATENT OFFICE.

CLARENCE T. MAPES, OF PITTSBURG, PENNSYLVANIA.

YOKE AND YOKE-SCREW.

No. 854,512.   Specification of Letters Patent.   Patented May 21, 1907.

Application filed September 21, 1906. Serial No. 335,612.

*To all whom it may concern:*

Be it known that I, CLARENCE T. MAPES, a citizen of the United States of America, residing at Pittsburg, in the county of Allegheny and State of Pennsylvania, have invented certain new and useful Improvements in Yoke and Yoke-Screws, of which the following is a specification, reference being had therein to the accompanying drawing.

This invention relates to yoke and yoke screws of novel construction adapted for use in connection with that class of devices employed in drilling oil, gas and Artesian wells known as "temper screws."

One object of the invention is to provide a yoke and yoke screw of novel construction in combination with a temper screw, whereby the yoke-screw may be locked against the split nut or temper screw box of the main or feed screw and permit the operator or driller to let out or unscrew the feed screw as the progress of drilling requires.

A further object of this invention is to provide a temper screw yoke in which the threaded portion which alone is subject to wear, may be conveniently and economically replaced.

A further object of the invention is to provide a yoke and yoke screw in which the wear on the threaded portion of the yoke screw and the threaded nut in the yoke is compensated for by the outward movement of a cone-shaped sectional nut in the taper-bored portion of the yoke.

The construction of the improvement will be fully described hereinafter in connection with the accompanying drawing which forms a part of this specification, and its novel features will be defined in the appended claims.

In the drawing, Figure 1 is a side elevation of a temper screw and reins partly broken away with my improved yoke in position thereon, Fig. 2 is a horizontal section on the line x—x of Fig. 1 showing the normal position of the yoke, screw firmly clamping the split nut on the main screw, Fig. 3 is a similar view showing the yoke screw released from contact with the split nut, and Fig. 4 is a section on the line y—y of Fig. 2.

The reference numeral 1 designates the main or feed screw extending between the split nut 2 of the reins 3 and 4.

The yoke 5 is provided with a tapered bore 6 serving as a seat for a conical sectional nut 7 internally threaded to receive a yoke screw 8 provided at its outer end with a head 9.

The yoke 5 is secured to the split nut 2 by screws 10 and the conical sectional nut 7 is adjustably secured within the tapered seat 6 of the yoke by oppositely disposed screws 11 extending through the yoke and projecting into diametrically opposite slots 12 formed in the sectional nut 7.

The utility and operation of the device constructed as thus described will be readily understood. The inward movement of the yoke screw tends to force the conical nut 7 into tight frictional engagement with the tapered seat 6 of the yoke thus compressing the threaded portions of the conical nut into the threads of the yoke-screw 8 firmly locking the device. The yoke screw firmly clamps the split nut 2 against the feed screw. To release the yoke screw from the split nut 2 the yoke screw is turned back or unscrewed a short distance from the nut 2, after which a blow with the hand or lever at the point a will release the engagement of the cone-shaped sectional nut with the tapered bore of the yoke. The yoke screw is then turned back a sufficient distance to permit the entire disengagement of the nut members 2 from the main screw 1 allowing the operator to elevate or pass upward the entire length of the main screw which has been turned or fed out. The yoke screw is then again adjusted to the position shown in Fig. 2.

What I claim and desire to secure by Letters Patent, is:—

1. A yoke for temper screws provided with a tapered seat, in combination with a sectional tapered nut within said seat, means for limiting the movement of said nut sections within said seat, and a yoke-screw extending through said sectional nut.

2. The combination with a temper screw and its reins, of a yoke encompassing the reins and provided with a tapered seat, a sectional conical nut within said seat, a yoke-screw extending through said nut, and means for limiting the movement of the sections of said nut comprising oppositely disposed screws projecting into slots in said sections.

3. The combination with a temper-screw, and its reins, of a yoke embracing said screw and reins, and secured to the latter, a tapering seat at one end of said yoke, a sectional conical nut and a screw extending through said nut to impinge against the adjacent rein member.

4. The combination with a temper screw, and its reins, of a yoke having a tapered seat at one end, a sectional conical nut fitting said seat, a yoke screw extending through said conical nut, and means for limiting the movement of said nut comprising diametrically opposite screws extending through the walls of the tapered seat, and into elongated slots in the sectional nut.

In testimony whereof I affix my signature in the presence of two witnesses.

CLARENCE T. MAPES.

Witnesses:
 H. C. EVERT,
 MAX H. SROLOVITZ.